(12) United States Patent
Suzuki

(10) Patent No.: US 11,203,234 B2
(45) Date of Patent: Dec. 21, 2021

(54) PNEUMATIC TIRE

(71) Applicant: The Yokohama Rubber Co., LTD., Tokyo (JP)

(72) Inventor: Naoko Suzuki, Hiratsuka (JP)

(73) Assignee: The Yokohama Rubber Co., LTD.

( * ) Notice: Subject to any disclaimer, the term of this patent is extended or adjusted under 35 U.S.C. 154(b) by 556 days.

(21) Appl. No.: 15/324,483

(22) PCT Filed: Aug. 11, 2015

(86) PCT No.: PCT/JP2015/072780
§ 371 (c)(1),
(2) Date: Jan. 6, 2017

(87) PCT Pub. No.: WO2016/024593
PCT Pub. Date: Feb. 18, 2016

(65) Prior Publication Data
US 2017/0190222 A1    Jul. 6, 2017

(30) Foreign Application Priority Data

Aug. 12, 2014 (JP) .............................. JP2014-164489

(51) Int. Cl.
*B60C 11/13* (2006.01)
*B60C 11/12* (2006.01)
*B60C 11/03* (2006.01)

(52) U.S. Cl.
CPC .......... *B60C 11/13* (2013.01); *B60C 11/0306* (2013.01); *B60C 11/1236* (2013.01);
(Continued)

(58) Field of Classification Search
CPC . B60C 11/0306; B60C 11/0309; B60C 11/13; B60C 11/1236; B60C 2011/0358;
(Continued)

(56) References Cited

U.S. PATENT DOCUMENTS

D795,171 S  *  8/2017  Suzuki .................... D12/586
2002/0139460 A1* 10/2002 Boiocchi ............. B60C 11/0302
152/209.2

(Continued)

FOREIGN PATENT DOCUMENTS

CN     103826874     5/2014
JP     S63-291706    11/1988
(Continued)

OTHER PUBLICATIONS

Machine translation of JP2010-228546 (no date).*
(Continued)

*Primary Examiner* — Steven D Maki
*Assistant Examiner* — Philip N Schwartz
(74) *Attorney, Agent, or Firm* — Thorpe North & Western

(57) ABSTRACT

A pneumatic tire includes first and second pairs of main grooves extending in the tire circumferential direction; and auxiliary grooves disposed in land portions located between the first and second main grooves which open to the corresponding first main groove or the corresponding second main groove and terminate within the corresponding land portion. Each of the auxiliary grooves includes a first auxiliary groove that extends from the opening portion to the bent portion and a second auxiliary groove that extends from the bent portion to the terminating end. A length a of the first auxiliary groove and a length b of the second auxiliary groove have the relationship 0.3a<b<0.8a. The angle θ made by the first auxiliary groove and the second auxiliary groove at the bent portion is in the range 0°<θ<90°.

25 Claims, 5 Drawing Sheets

(52) U.S. Cl.
CPC . *B60C 2011/036* (2013.01); *B60C 2011/0358* (2013.01); *B60C 2011/0372* (2013.01); *B60C 2011/0381* (2013.01); *B60C 2011/1209* (2013.01)

(58) Field of Classification Search
CPC ....... B60C 2011/036; B60C 2011/0381; B60C 2011/1209; B60C 2011/0372; B60C 2011/0365
See application file for complete search history.

(56) References Cited

U.S. PATENT DOCUMENTS

| | | | | |
|---|---|---|---|---|
| 2009/0165908 | A1* | 7/2009 | Takahashi | B60C 11/0306 152/209.18 |
| 2009/0255614 | A1* | 10/2009 | Ebiko | B60C 11/0302 152/209.8 |
| 2010/0212796 | A1 | 8/2010 | Iwabuchi | |
| 2011/0220258 | A1 | 9/2011 | Taniguchi et al. | |
| 2012/0168048 | A1 | 7/2012 | Suganuma | |
| 2012/0291934 | A1* | 11/2012 | Iwabuchi | B60C 11/0306 152/209.18 |
| 2014/0326381 | A1 | 11/2014 | Hamanaka | |
| 2016/0207359 | A1* | 7/2016 | Nukushina | B60C 13/00 |

FOREIGN PATENT DOCUMENTS

| | | | |
|---|---|---|---|
| JP | H08-276708 | 10/1996 | |
| JP | 2003-146018 | 5/2003 | |
| JP | 2005161921 A * | 6/2005 | ............ B60C 11/04 |
| JP | 2007-237816 | 9/2007 | |
| JP | 2008-094140 | 4/2008 | |
| JP | 2008-221964 | 9/2008 | |
| JP | 2009-067173 | 4/2009 | |
| JP | 2010-047134 | 3/2010 | |
| JP | 2010-228546 | 10/2010 | |
| JP | 2011-183952 | 9/2011 | |
| JP | 2012-171479 | 9/2012 | |
| WO | WO 2009/034959 | 3/2009 | |
| WO | WO 2010/147076 | 12/2010 | |
| WO | WO 2013/042257 | 3/2013 | |

OTHER PUBLICATIONS

Machine translation of JP2010-047134 (no date).*
Machine translation of JP2005-161921 (no date).*
International Search Report for International Application No. PCT/JP2015/072780 dated Oct. 27, 2015, 4 pages, Japan.

* cited by examiner

PNEUMATIC TIRE

TECHNICAL FIELD

The present technology relates to a pneumatic tire.

BACKGROUND ART

For pneumatic tires, improvements in quietness, i.e. a reduction in noise when travelling, is desired. However, improvements in quietness have tended to decrease performance in other areas. The performance of pneumatic tires in various areas is constantly being improved by enhancements to the structure of the tire and the patterns in the surface. In all-season pneumatic tires designed with wet performance and snow performance in mind, patterns that improve the wet performance and snow performance have tended to reduce quietness.

A pneumatic tire that reduces noise when travelling is known that includes a plurality of lug grooves with a bent shape disposed in a land portion of a tread portion. These lug grooves help dissipate air column resonance in main grooves (see for example Japanese Unexamined Patent Application Publication Nos. 2012-171479A and 2007-237816A).

Additionally, a pneumatic tire is known designed to have enhanced steering stability on wet road surfaces while ensuring suitable snow performance. This is achieved by a configuration including sub-grooves that terminate in a land portion and curve in the opposite direction (see for example Japanese Unexamined Patent Application Publication No. 2010-047134A).

The pneumatic tires described in Japanese Unexamined Patent Application Publication Nos. 2012-171479A, 2007-237816A and 2010-047134A have improved wet performance and snow performance, but have room for improvement in terms of quietness.

SUMMARY

The present technology provides a pneumatic tire with improved wet performance, snow performance, and quietness.

A pneumatic tire according to the present technology comprises:

a pair of first main grooves extending in a tire circumferential direction formed on opposite outer sides in a tire width direction of a first land portion which includes a tire equatorial plane;

a pair of second main grooves extending in the tire circumferential direction located further outward in the tire width direction than the first main grooves; and auxiliary grooves disposed in second land portions located between the first main grooves and the second main grooves which open to the corresponding first main groove or the corresponding second main groove and terminate within the corresponding second land portion; wherein each of the auxiliary grooves bends at a bent portion and includes a first auxiliary groove which extends from the opening to the bent portion and a second auxiliary groove which extends from the bent portion to a terminating end portion;

a length a of the first auxiliary groove and a length b of the second auxiliary groove have a relationship $0.3a < b < 0.8a$; and an angle θ made by the first auxiliary groove and the second auxiliary groove at the bent portion is in a range $0° < \theta < 90°$.

The pneumatic tire according to the present technology preferably further comprises third land portions disposed further outward in the tire width direction than the second main grooves, and third auxiliary grooves which are disposed in the third land portions and extend outward in the tire width direction; wherein end portions of the third auxiliary grooves proximal to the second main grooves terminate within the third land portions.

The pneumatic tire according to the present technology preferably further comprising first narrow grooves disposed in the first land portion.

The pneumatic tire according to the present technology preferably has a configuration wherein the first narrow grooves terminate within the first land portion.

The pneumatic tire according to the present technology preferably has a configuration wherein the first narrow grooves have a width of 1.2 mm or less.

The pneumatic tire according to the present technology preferably has a configuration wherein the second land portions have a point symmetrical configuration with respect to the tire equatorial plane.

The pneumatic tire according to the present technology preferably has a configuration wherein a groove width of the first auxiliary groove at the bent portion is from 10% to 50% less than a groove width at the opening portion.

The pneumatic tire according to the present technology preferably has a configuration wherein the first auxiliary groove forms an angle with the tire circumferential direction of from 30° to 70°.

The pneumatic tire according to the present technology preferably further comprising second narrow grooves disposed in the second land portions, the second narrow grooves forming an angle with the tire circumferential direction of from 30° to 70°.

The pneumatic tire according to the present technology preferably has a configuration wherein the first auxiliary grooves intersect the second narrow grooves.

The pneumatic tire according to the present technology preferably has a configuration wherein the second narrow grooves have a width of 1.2 mm or less.

The pneumatic tire according to the present technology preferably has a configuration wherein the first auxiliary grooves open to the second main grooves.

The pneumatic tire according to the present technology preferably further comprising third narrow grooves disposed in the third land portions, the third narrow grooves extending in a shoulder direction.

The pneumatic tire according to the present technology preferably has a configuration wherein the third narrow grooves do not open to the second main grooves.

The pneumatic tire according to the present technology preferably has a configuration wherein the third narrow grooves have a width of 1.2 mm or less.

The pneumatic tire according to the present technology preferably has a configuration wherein side walls extending in the tire circumferential direction of the first main grooves and the second main grooves have a zigzag shape in which a position in the tire width direction of the side walls periodically changes.

According to the pneumatic tire of the present technology, snow performance and quietness can be improved while maintaining wet performance, thus wet performance, snow performance, and quietness can be achieved at a high level.

DETAILED DESCRIPTION

Embodiments of the pneumatic tire according to the present technology are described below in detail based on the drawings. However, the present technology is not limited by the embodiments. In addition, the components of the embodiments include components that are replaceable while maintaining consistency with the technology, and obviously replaceable components. Furthermore, modified examples described with the embodiments may be combined as desired within the scope apparent to those skilled in the art.

Figure 1:
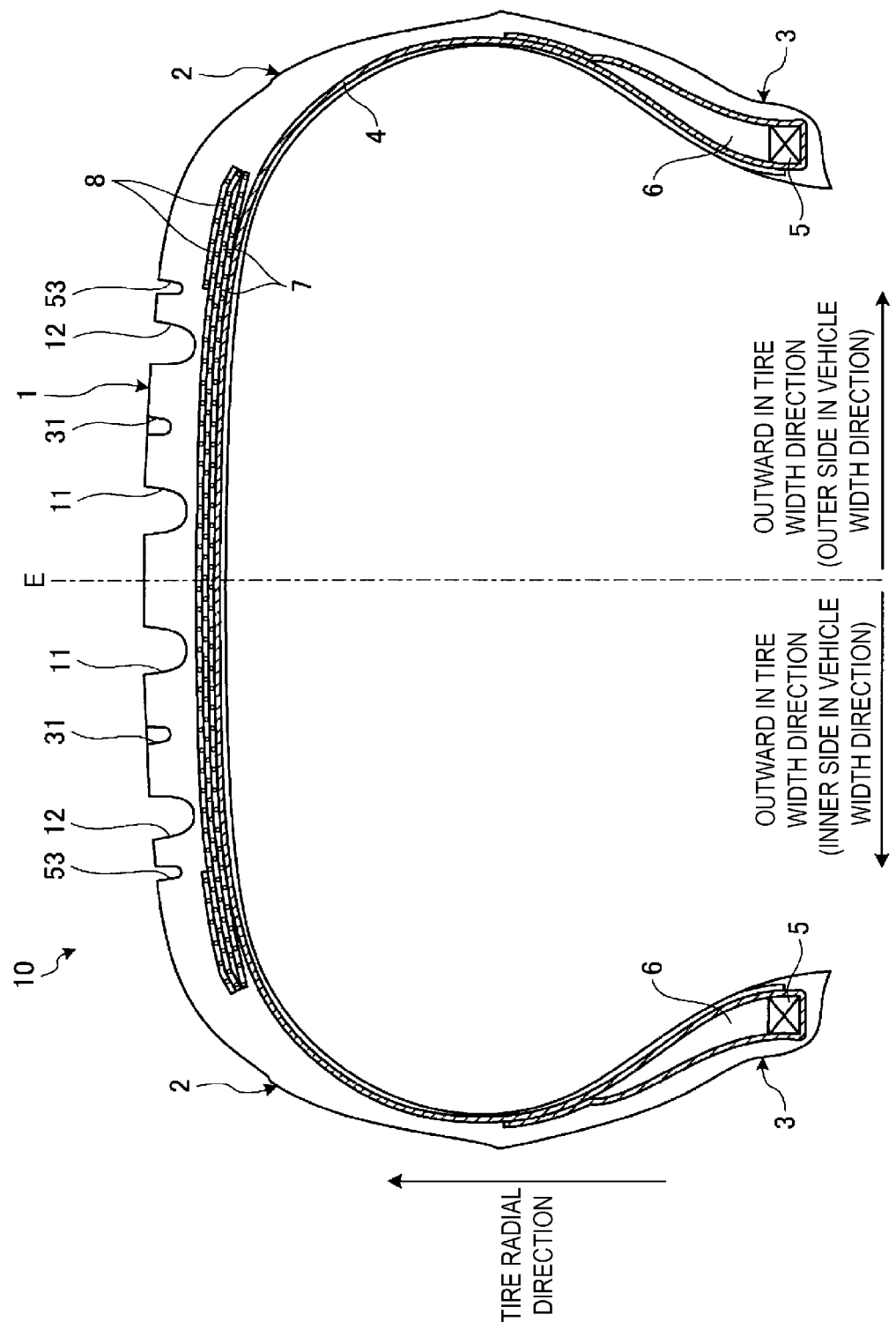
FIG. 1 is a meridian cross-sectional view illustrating a pneumatic tire according to an embodiment of the present technology.
Figure 2:
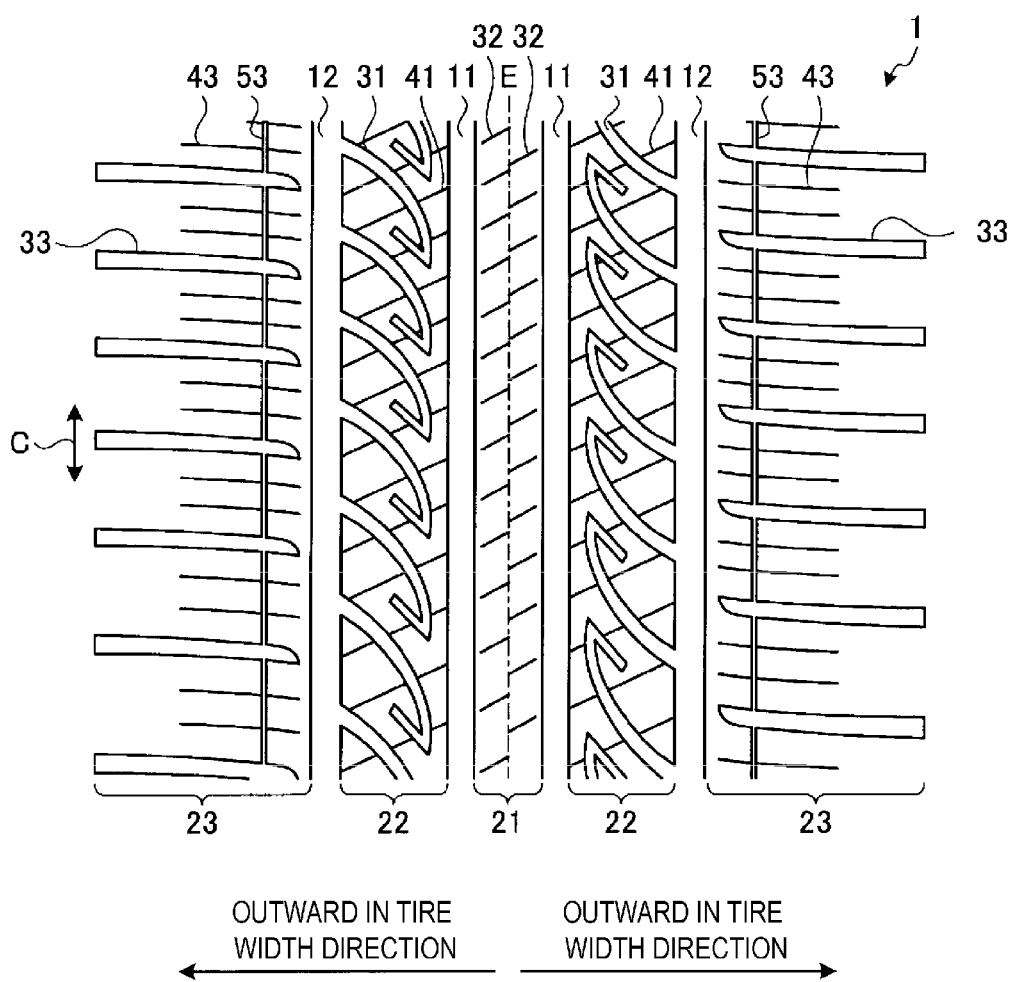
FIG. 2 is a developed view illustrating a tread pattern of the pneumatic tire according to the embodiment of the present technology.
Figure 3:
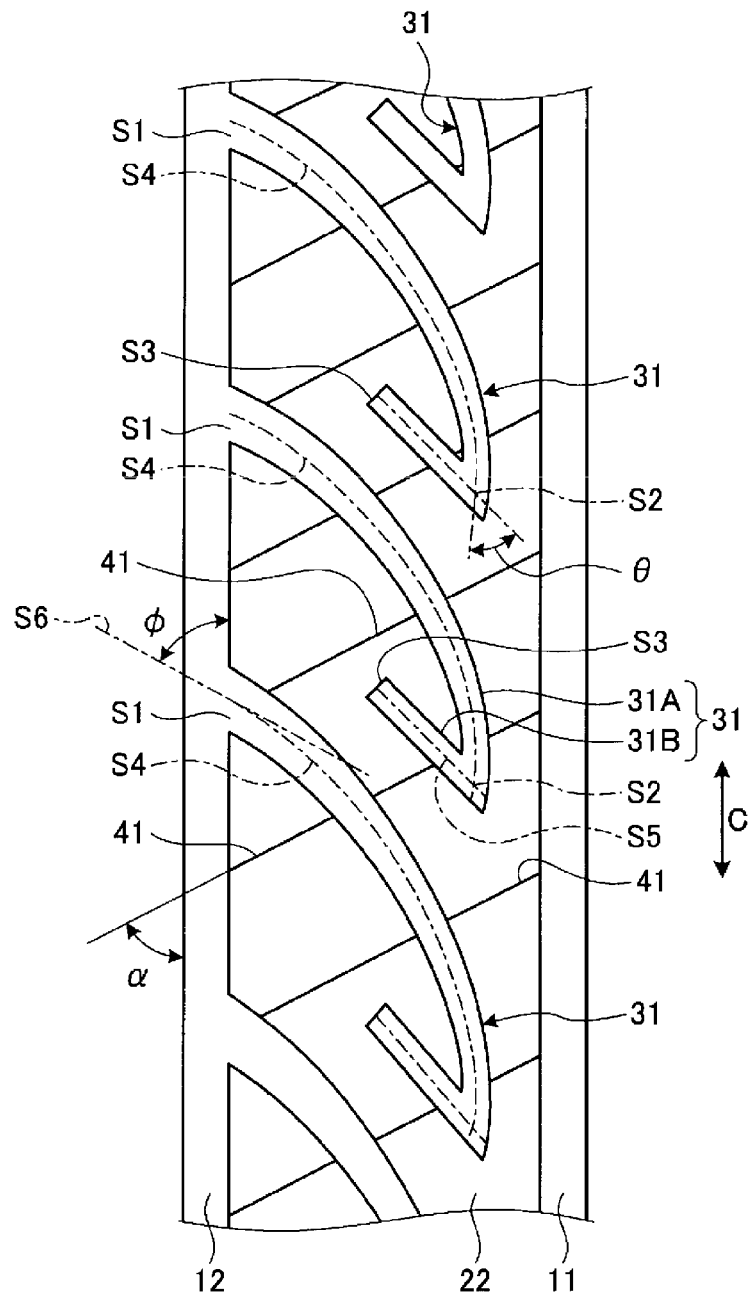
FIG. 3 is a plan view focusing on a second land portion of the tread pattern of FIG. 2.
Figure 4:
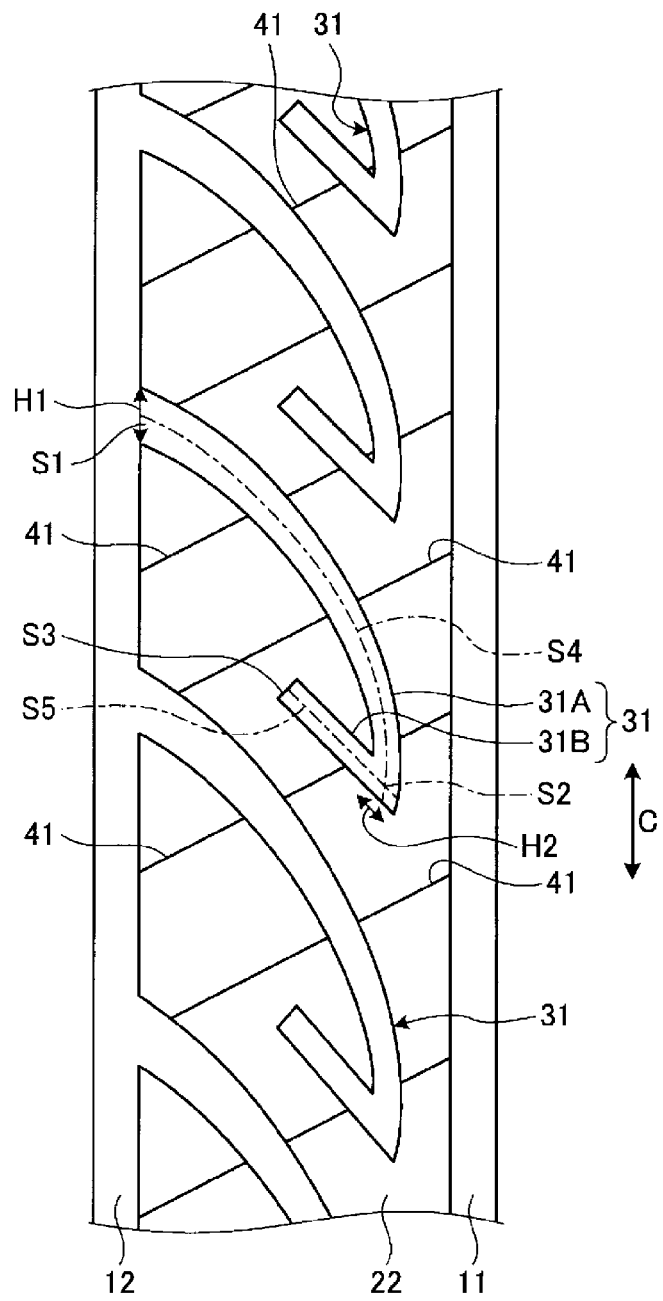
FIG. 4 is a plan view focusing on the second land portion of the tread pattern of FIG. 2.

FIG. 1 is a meridian cross-sectional view illustrating a pneumatic tire according to the embodiment of the present technology. FIG. 2 is a developed view illustrating a tread pattern of the pneumatic tire according to the embodiment of the present technology. FIG. 3 is a plan view focusing on a second land portion of the tread pattern of FIG. 2. FIG. 4 is a plan view focusing on the second land portion of the tread pattern of FIG. 2.

In the following description, "tire radial direction" refers to the direction orthogonal to the rotational axis (not illustrated) of a pneumatic tire 10. "Inward in the tire radial direction" refers to the direction toward the rotational axis in the tire radial direction, and "outward in the tire radial direction" refers to the direction away from the rotational axis in the tire radial direction. "Tire circumferential direction" refers to the circumferential direction with the axis of rotation as the center axis. Additionally, "tire width direction" refers to the direction parallel to the rotational axis. "Inward in the tire width direction" refers to the direction toward a tire equatorial plane E in the tire width direction, and "outward in the tire width direction" refers to the direction away from the tire equatorial plane E in the tire width direction. "Tire equatorial plane E" refers to a plane that is orthogonal to the rotational axis of the pneumatic tire 10 and that passes through the center of the pneumatic tire 10 in the tire width direction. "Tire width" is a width in the tire width direction between components located outward in the tire width direction, or in other words, the distance between the outermost components in the tire width direction from the tire equatorial plane E. "Tire equatorial line" refers to a line along the tire circumferential direction of the pneumatic tire 10 that lies on the tire equatorial plane E. In the embodiment, the tire equator and the tire equatorial plane share the reference sign E.

As illustrated in FIG. 1, the pneumatic tire 10 of the present embodiment is provided with a tread portion 1 extending in the tire circumferential direction to form an annular shape, a pair of sidewall portions 2, 2 that is disposed on both sides of the tread portion 1, and a pair of bead portions 3, 3 that is disposed inward in the tire radial direction of the sidewall portions 2.

A carcass layer 4 is mounted between the pair of bead portions 3, 3. The carcass layer 4 includes a plurality of reinforcing cords extending in the tire radial direction and is folded back around bead cores 5 disposed in each of the bead portions 3 from a tire inner side to a tire outer side. A bead filler 6 having a triangular cross-sectional shape formed from a rubber composition is disposed on a periphery of the bead cores 5.

A plurality of belt layers 7 are embedded on the outer circumferential side of the carcass layer 4 in the tread portion 1. These belt layers 7 include a plurality of reinforcing cords that are inclined with respect to the tire circumferential direction with the direction of the reinforcing cords of different layers intersecting each other. In the belt layers 7, the inclination angle of the reinforcing cords with respect to the tire circumferential direction is set in a range of from 10° to 40°, for example. Steel cords are preferably used as the reinforcing cords of the belt layers 7. For the purpose of improving the high-speed durability, at least one belt cover layer 8, in which the reinforcing cords line up at an angle of, for example, 5° or less with respect to the tire circumferential direction, is disposed on the outer peripheral side of the belt layers 7. Organic fiber cords of nylon, aramid, or the like are preferably used as the reinforcing cords of the belt cover layer 8.

Note that the tire internal structure described above is exemplary of a pneumatic tire, but is not limited thereto.

As illustrated in FIG. 2, in the tread portion 1, a pair of first main grooves 11 and a pair of second main grooves 12 are formed. The first main grooves 11 are located on opposite sides of the tire equatorial plane E and extend in the tire circumferential direction C. The second main grooves 12 are located on opposite sides of the tire equatorial plane E further outward in the tire width direction than the first main grooves 11 and extend in the tire circumferential direction. The first main grooves 11 and the second main grooves 12 have a groove width measured in the tire width direction of from 5.0 (mm) to 15.0 (mm), and a groove depth of from 5.0 (mm) to 15.0 (mm), for example. Note that the groove width and the groove depth of the first main grooves 11 and the second main grooves 12 are not limited to the ranges described above.

The first main grooves 11 and the second main grooves 12 formed in the tread portion 1 define a plurality of land portions. Specifically, the tread portion 1 includes a land portion located between the pair of first main grooves 11 that intersects the tire equatorial plane E and extends in the tire circumferential direction. This land portion is defined as first land portion 21. The tread portion 1 includes land portions between the first main grooves 11 and the second main grooves 12 that extend in the tire circumferential direction. These land portions are defined as second land portions 22. Additionally, the tread portion 1 includes land portions located outward in the tire width direction of the second main grooves 12. These land portions are defined as third land portions 23.

A plurality of first narrow grooves 32 are formed in the first land portion 21 of the tread portion 1 at intervals in the tire circumferential direction C. The plurality of first narrow grooves 32 are formed with an orientation so as to extend in the tire width direction. Each first narrow groove 32 terminates at both end portions within the first land portion 21. Specifically, each first narrow groove 32 terminates before the tire equatorial plane E without crossing the tire equatorial plane E and also terminates within the first land portion 21 without opening to the corresponding first main groove 11. The first narrow grooves 32 are sipes, for example. This is the same for other narrow grooves described below. Note that the width of the first narrow grooves 32 is 1.2 (mm) or less.

The second land portions 22 are disposed on opposite sides of the tire equatorial plane E. The second land portions 22 on opposite sides of the tire equatorial plane E have the same form when rotated 180°. Accordingly, the second land portions 22 are disposed with point symmetry across the tire equatorial plane E.

In the second land portions 22 located between the first main grooves 11 and the second main grooves 12, a plurality of auxiliary grooves 31 are formed at intervals in the tire circumferential direction C. The auxiliary grooves 31 have a bent shape of a bent fishhook. As illustrated in FIGS. 3 and 4, each auxiliary groove 31 opens at one end portion to the second main groove 12 and at the other end portion, a terminating end portion S3, terminates within the second land portion 22. Each auxiliary groove 31 is constituted by a first auxiliary groove 31A and a second auxiliary groove 31B. The first auxiliary groove 31A extends from an opening portion to the second main groove 12, which is an opening end S1, to a bend point S2. The second auxiliary groove 31B extends from the bend point S2 to the terminating end portion S3. The positions of the opening end S1, the bend point S2, and the terminating end portion S3 are determined using center lines running through the center in the width direction of the first auxiliary groove 31A and the second auxiliary groove 31b. In other words, the bend point S2 is a point of intersection between the center line of the first auxiliary groove 31A and the center line of the second auxiliary groove 31b. Each auxiliary groove 31 has a shape in which the second auxiliary groove 31B bends toward the opening end S1 to the second main groove 12 from the bend point S2, and the terminating end portion S3 is close to the first auxiliary groove 31A.

The first auxiliary groove 31A of the present embodiment is formed with the opening end S1 on the second main groove 12 side. In other embodiments however, the opening end S1 may be on the first main groove 11 side.

The opening end S1 of the auxiliary groove 31 has a width that is greater than the width of other portions. The groove width of the first auxiliary groove 31A of the auxiliary groove 31 gradually lessens as the first auxiliary groove 31A extends from the opening end S1, which is the opening portion, toward the bend point S2, which is a bent portion. In the present embodiment, a groove width H2 of the first auxiliary groove 31A at the bent portion is from 10% to 50% less than a groove width H1 at the opening portion. In other words, the groove width H2 at the bent portion is from 50% to 90% of the groove width H1 at the opening end S1. The groove width of the first auxiliary groove 31A at the bent portion is the width at the groove wall surface of the second auxiliary groove 31B if the groove wall was extended. In such a manner, the groove width of the first auxiliary groove 31A gradually lessens as the first auxiliary groove 31A extends from the opening end S1 toward the bend point S2, and the second auxiliary groove 31B bends from the bend point S2 and terminates at the terminating end portion S3.

The first auxiliary groove 31A and the second auxiliary groove 31B, which constitute the auxiliary groove 31, have a length a and a length b, respectively. The relationship between the length a and the length b is as follows:

$$0.3a < b < 0.8a.$$

In other words, the length b of the second auxiliary groove 31B is greater than 30% and less than 80% of the length a of the first auxiliary groove 31A. The length a of the first auxiliary groove 31A, as illustrated in FIG. 3, is the length of a center line S4 which extends from the opening end S1 to the bend point S2 running through the center points in the width direction of the first auxiliary groove 31A. The length b of the second auxiliary groove 31B, as illustrated in FIG. 3, is the length of a center line S5 which extends from the terminating end portion S3 to the bend point S2 running through the center points in the width direction of the second auxiliary groove 31B. Note that the wall surface that constitutes the first auxiliary groove 31A has a length a' and the wall surface that constitutes the second auxiliary groove 31B has a length b'. The relationship between the length a' and the length b' is preferably similar to that described above as follows:

$$0.3a' < b' < 0.8a'.$$

Additionally, an angle θ made by the first auxiliary groove 31A and the second auxiliary groove 31B is preferably an acute angle in the range that follows:

$$0° < θ < 90°.$$

In embodiments with a curved wall surface for the first auxiliary groove 31A or the second auxiliary groove 31B, the angle θ of the tangent line at any point on the curved line of the curved surface in a plan view is preferably in the following range:

$$0° < θ < 90°.$$

A plurality of second narrow grooves 41 inclined with respect to the tire circumferential direction C are formed in the second land portion 22 at intervals in the tire circumferential direction C. The second narrow grooves 41 are inclined with respect to the tire circumferential direction. The second narrow grooves 41 are formed spanning across the second land portion 22, intersecting the auxiliary grooves 31. An inclination angle α of the second narrow grooves 41 with respect to the tire circumferential direction C is preferably from 30° to 70°.

Additionally, as illustrated in FIG. 3, in the pneumatic tire 10, an angle φ and the inclination angle α of the second narrow grooves 41 with respect to the tire circumferential direction C are in a plus/minus opposite relationship to each other. The angle φ is that of a tangent line S6 of the center line S4 at the opening end S1 of the first auxiliary groove 31A with respect to the tire circumferential direction C. Accordingly, the first auxiliary grooves 31A and the second narrow grooves 41 intersect one another.

A plurality of lug grooves extending outward in the tire width direction are disposed at intervals in the tire circumferential direction C in each of the third land portions 23 located in shoulder regions of the tread portion 1. These lug grooves are defined as third auxiliary grooves 33. Each third auxiliary groove 33 terminates at the end portion proximal to the second main groove 12 within the third land portion 23.

Additionally, third narrow grooves 43 are disposed in the third land portions 23. The third narrow grooves 43 are preferably straight or curved. Inner portions of the third narrow grooves 43 are preferably bent, or in other words, the third narrow grooves 43 are preferably 3D sipes. The third narrow grooves 43 preferably have a form that shows only one line even after wear. The third narrow grooves 43 do not open to the second main grooves 12.

Additionally, a circumferential narrow groove 53 extending in the tire circumferential direction is formed in each third land portion 23. The groove width of the circumferential narrow grooves 53 is not particularly limited, however may be in the range of from 1 (mm) to 25 (mm), for example.

The pneumatic tire of the present embodiment described above includes:

a pair of first main grooves 11 extending in the tire circumferential direction C formed on opposite outer sides in the tire width direction of the first land portion 21 which includes the tire equatorial plane E;

a pair of second main grooves 12 extending in the tire circumferential direction C located further outward in the tire width direction than the first main grooves 11;

auxiliary grooves 31 disposed in at least one of second land portions 22 located between the first main grooves 11 and the second main grooves 12 which open to the corresponding first main groove 11 or the corresponding second main groove 12 and terminate within the corresponding second land portion 22.

Each of the auxiliary grooves 31 bends at the bent portion and includes a first auxiliary groove 31A that extends from the opening to the bent portion and the second auxiliary groove 31B that extends from the bent portion to the terminating end portion. The length a of the first auxiliary groove 31A and the length b of the second auxiliary groove 31B have the relationship $0.3a<b<0.8a$. The angle $\theta$ made by the first auxiliary groove 31A and the second auxiliary groove 31B at the bent portion is in the range $0°<\theta<90°$.

According to this pneumatic tire, snow performance and quietness can be improved while maintaining wet performance, thus wet performance, snow performance, and quietness can be achieved at a high level.

Additionally, the pneumatic tire of the present embodiment further includes the third land portions 23 located outward in the tire width direction of the second main grooves 12. Each third land portion 23 includes third auxiliary grooves 33, which are lug grooves extending outward in the tire width direction. The end portion of each third auxiliary groove 33 proximal to the second main groove 12 terminates within the third land portion 23. By not having a groove that opens to the second main groove 12, noise can be suppressed.

Additionally, the first land portion 21 is disposed between the first main grooves 11 and intersects the tire equatorial plane E. In the first land portion 21, which is a center portion of the tire, the first narrow grooves 32 are disposed instead of auxiliary grooves. By having narrow grooves instead of auxiliary grooves, the ground contact area at the center portion of the tire can be ensured, thus increasing traction particularly when driving.

Additionally, in the first land portion 21, the first narrow grooves 32 do not open to the first main grooves 11 and terminate within the first land portion 21. By the first narrow grooves 32 having a form that does not open to the first main grooves 11, air column resonance from the first main grooves 11 can be suppressed.

The second land portions 22 are disposed on opposite sides of the tire equatorial plane E. The second land portions 22 on opposite sides of the tire equatorial plane E have the same form when rotated 180°. Accordingly, the second land portions 22 are disposed with point symmetry across the tire equatorial plane E. By the second land portions 22 being disposed equally in the inner side in the vehicle width direction and the outer side in the vehicle width direction, water drainage properties when travelling straight on wet road surfaces can be ensured.

In the present embodiment, the opening end S1 of the auxiliary groove 31 is disposed proximal to the second main groove 12. By the auxiliary groove 31 with the opening end S1 disposed on the outer side in the tire width direction having a width that is greater than that at other portions, snow performance can be improved.

In the present embodiment, the groove width H2 of the first auxiliary groove 31A at the bent portion is from 10% to 50% less than the groove width H1 at the opening portion. In other words, the groove width H2 at the bent portion is from 50% to 90% of the groove width H1 at the opening portion. Accordingly, the channeling of snow and water through the grooves improves, thus enabling the improvement of snow performance and wet performance. Note that in the auxiliary groove 31, if the difference in groove depth from the opening portion to the terminating end portion is too great, quietness is adversely affected and other problems involving wear and the like occur. According to the present embodiment, such problems are not present.

The plurality of third auxiliary grooves 43, which are lug grooves extending in the tire width direction, are disposed at intervals in the tire circumferential direction C in each of the third land portions 23 located in shoulder regions of the tread portion 1. By the third narrow grooves 43 being disposed in the shoulder regions of the tread portion 1, the snow performance can be improved.

The third narrow grooves 43 do not open to the second main grooves 12. By the third narrow grooves 43 not opening to the second main grooves 12, pass-by noise caused by air column resonance from the second main grooves 12 can be suppressed, and thus quietness can be further enhanced.

The pneumatic tire described above includes a plurality of second auxiliary groove 31B with a bent shape disposed in the second land portions 22 located between the first main grooves 11 and the second main grooves 12, and the second land portions 22 are not divided into a plurality of blocks. As a result, an increase in pattern noise can be prevented. Additionally, by the plurality of auxiliary grooves 31 with a bent shape opening to the second main grooves 12, air column resonance from the second main grooves 12 can be attenuated via the sound absorbing effect of the auxiliary grooves 31.

Additionally, by the auxiliary groove 31 having a form in which the second auxiliary groove 31B bends toward the first auxiliary groove 31A at the bend point S2, wet performance and snow performance can be improved via the edge effects of the first auxiliary groove 31A and the second auxiliary groove 31B. In particular, the auxiliary groove 31 has a structure in which the groove width of the first auxiliary groove 31A becomes gradually less as the first auxiliary groove 31A extends from the opening end S1 toward the bend point S2, thus facilitating the discharge of snow built up in the auxiliary groove 31. As a result, a decrease in snow performance caused by snow build up can be prevented. Additionally, in embodiments in which the groove width of the first auxiliary groove 31A gradually lessens as the first auxiliary groove 31A extends from the opening end S1 to the bend point S2, the channeling of water in the auxiliary grooves 31 is improved, thus enabling enhancements in wet performance to be obtained.

In the pneumatic tire described above, the first main grooves 11 are disposed further outward in the tire width direction than the tire equatorial plane E and the second main grooves 12 are disposed further outward in the tire width direction than the first main grooves 11. One end portion of the first auxiliary groove 31A opens to the second main groove 12, thus the auxiliary groove 31 at one end portion opens outward in the tire width direction. As a result, excellent snow performance can be exhibited.

Additionally, in the pneumatic tire described above, the first land portion 21 is disposed on the tire equatorial plane E, and the second land portions 22 including the plurality of auxiliary grooves 31 are disposed on opposite sides of the first land portion 21. As a result, braking performance on snow is increased, thus enabling excellent snow performance.

As illustrated in FIG. 3, the bend angle θ between the first auxiliary groove 31A and the second auxiliary groove 31B of the auxiliary groove 31 is less than 90°. As a result, the edge effects of the auxiliary grooves 31 can be sufficiently ensured, and thus snow performance can be improved. The first auxiliary groove 31A and the second auxiliary groove 31B can extend in a rectilinear or curved manner. In either case, the bend angle θ is the angle at the bend point S2 made by the first auxiliary groove 31A and the second auxiliary groove 31B. Note that when the bend angle θ is 90° or greater, the pitch between the auxiliary grooves 31 is required to be increased, and thus edge effects become insufficient.

As described above, the plurality of second narrow grooves 41 inclined with respect to the tire circumferential direction C are disposed in each second land portion 22 at intervals in the tire circumferential direction C. By the inclination angle α of the second narrow grooves 41 with respect to the tire circumferential direction C being in the range of from 30° to 70°, snow performance and wet performance can be further improved via the edge effects of the second narrow grooves 41.

Additionally, as described above and as illustrated in FIG. 3, the angle φ of the tangent line S6 of the center line S4 at the opening end S1 of the first auxiliary groove 31A with respect to the tire circumferential direction C, and the inclination angle α of the second narrow grooves 41 with respect to the tire circumferential direction C are in an plus/minus opposite relationship to each other, and the first auxiliary grooves 31A and the second narrow grooves 41 intersect. By the second narrow grooves 41 and the first auxiliary grooves 31A intersecting one another, non-uniform collapsing of the second land portions 22 caused by the first auxiliary grooves 31A can be prevented. When the inclination angle α of the second narrow grooves 41 with respect to the tire circumferential direction C is outside of the range described above, the effect of enhancing snow performance and wet performance is decreased.

Figure 5:
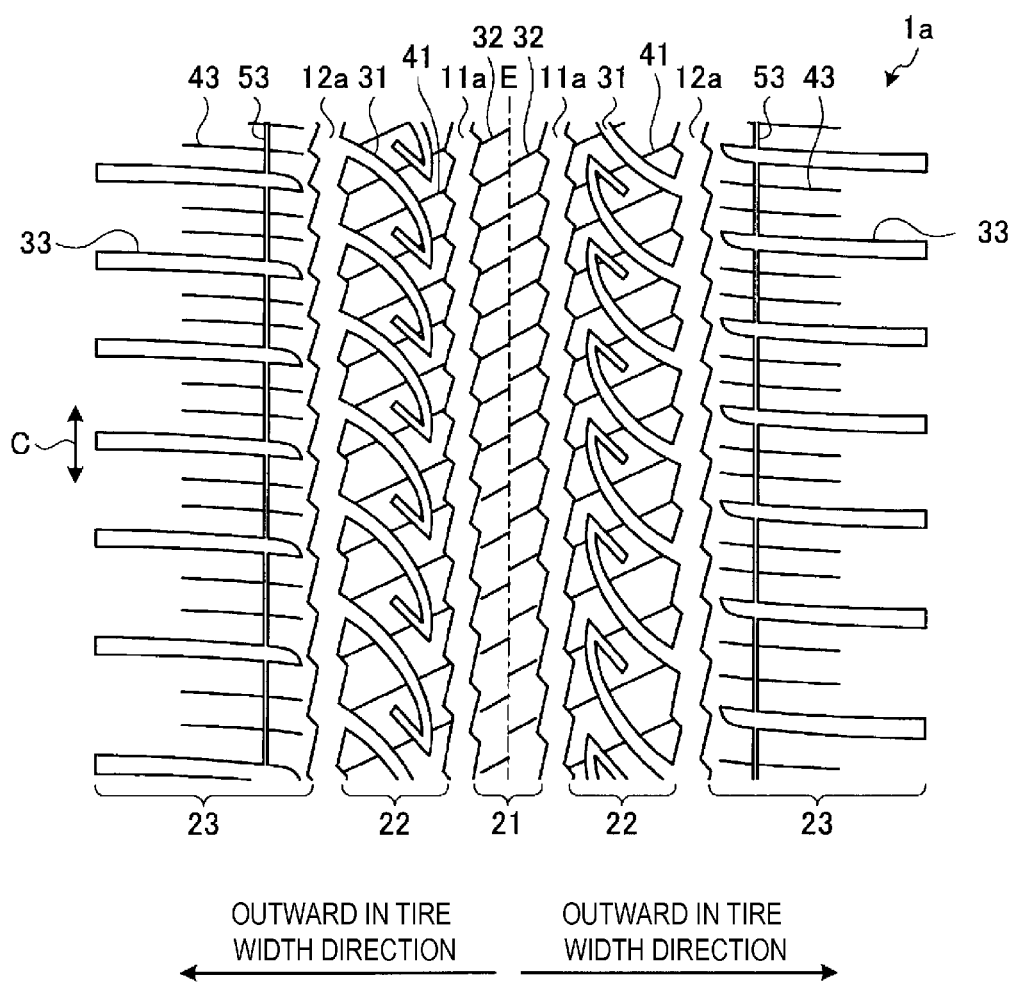
FIG. 5 is a developed view illustrating another example of a tread pattern of a pneumatic tire according to the embodiment of the present technology.

FIG. 5 is a developed view illustrating another example of a tread pattern of a pneumatic tire according to the embodiment of the present technology. As illustrated in FIG. 5, in the tread portion 1a, a pair of first main grooves 11a (first main grooves) and a pair of second main grooves 12a (second main grooves) are formed. The first main grooves 11a are located on opposite sides of the tire equatorial plane E and extend in the tire circumferential direction. The second main grooves 12a are located on opposite sides of the tire equatorial plane E further outward in the tire width direction than the first main grooves 11 and extend in the tire circumferential direction. The main grooves 11a and the main grooves 12a both have a zigzag shape. The zigzag shape of the main grooves 11a and the main grooves 12a may meanders in the tire circumferential direction turning at angles, or may meander in the tire circumferential direction while gently curving. In other words, the zigzag shape of the present embodiment have a shape in which the position in the tire width direction of the side walls of the main grooves 11a and the main grooves 12a, which extend in the tire circumferential direction, periodically changes. The main grooves 11a and the main grooves 12a include two side walls extending in the tire circumferential direction. Both of the side walls have a zigzag shape. The main grooves 11a and the main grooves 12a are only required to have a zigzag shape in the road contact surface, which contacts the road, when travelling. The side walls of the main grooves 11a and the main grooves 12a may have a zigzag shape from the road contact surface to the groove bottom, or may have a zigzag shape formed by chamfering the side walls at the side proximal to the road contact surface. Additionally, the main grooves 11a and the main grooves 12a are preferably provided in the tire circumferential direction with at least one zigzag shape pattern between lug grooves of the same shape that repeats. Furthermore, the zigzag shape preferably has the same undulating pattern continuous in the tire circumferential direction, however differing undulating shapes may be formed continuously in the circumferential direction. The dimensions of the main grooves 11a and the main grooves 12a are not particularly limited. For example, the groove width as measured in the tire width direction may be from 5.0 (mm) to 15.0 (mm), and the groove depth may be from 5.0 (mm) to 15.0 (mm).

By the main grooves 11a and the main grooves 12a of the tread portion 1a having a zigzag shape, air column resonance from the main grooves 11a and the main grooves 12a can be suppressed. Additionally, by the main grooves 11a and the main grooves 12a of the tread portion 1a having a zigzag shape, wet performance and snow performance can be improved via edge effects from the edge portions of the zigzag shape.

Furthermore, by the auxiliary groove 31 of the tread portion 1a having a form in which the second auxiliary groove 31B bends toward the first auxiliary groove 31A at the bend point P2, wet performance and snow performance can be improved via the edge effects of the first auxiliary groove 31A and the second auxiliary groove 31B. In particular, the auxiliary groove 31 has a structure in which the groove width of the first auxiliary groove 31A becomes gradually less as the first auxiliary groove 31A extends from the opening end S1 toward the bend point S2, thus facilitating the discharge of snow built up in the auxiliary groove 31. As a result, a decrease in snow performance caused by snow build up can be prevented. Additionally, in embodiments in which the groove width of the first auxiliary groove 31A gradually lessens as the first auxiliary groove 31A extends from the opening end S1 to the bend point S2, the channeling of water in the auxiliary grooves 31 is improved, thus enabling enhancements in wet performance to be obtained.

As a result, the synergistic effects of the tread portion 1a having the zigzag shaped main grooves 11a and main grooves 12a and the plurality of auxiliary grooves 31 with a bent shape allows quietness, snow performance, and wet performance to be improved.

Embodiment 1

Tables 1 to 3 show the results of performance testing of pneumatic tires according to the present technology. Evaluations of wet performance, snow performance, and quietness of different pneumatic tires were conducted for the performance tests. In these performance tests, pneumatic tires with a tire size of 205/55R16 91V were assembled on rims with a rim size of 16×6.5JJ and inflated to an air pressure of 200 (kPa). Additionally, a front engine-front drive (FF) passenger car with an engine displacement of 1.6 L was used as the test vehicle.

In the performance test for wet performance, the test vehicle was driven on a test course with a wet road surface, and while traveling at a speed of 100 (km/h), breaking controlled by an anti-lock braking system (ABS) was performed to stop the vehicle. The braking distance was measured. For evaluation, the inverse of the measured values were taken and expressed as index values using the value of the conventional example tire as the reference value (100). Larger values indicate less braking distance and thus desirable superior wet performance.

In the performance test for snow performance, the test vehicle was driven on a test course with a surface covered in compacted snow. While travelling at an initial speed of 40 (km/h), breaking controlled by an ABS was performed. The distance traveled until the vehicle came to a stop was measured and evaluated. For evaluation, the results were expressed as index values using the value of the conventional example tire as the reference value (100). Larger values are preferable.

In the performance test for quietness, the test vehicle was driven on a test course with a dry road surface. The test driver performed a feeling evaluation on vehicle interior noise during coasting from a speed of 100 (km/h) to 20 (km/h). For evaluation, the results were expressed as index values using the value of the conventional example tire as the reference value (100). Larger values are preferable.

Note that in these performance tests, pneumatic tires scoring values of 104 or higher are considered to be superior, and pneumatic tires scoring values in a range of from 100 to 103 are considered to be equivalent.

The pneumatic tires of Working Examples 1 to 30 each include:

a pair of first main grooves extending in the tire circumferential direction formed on opposite outer sides in the tire width direction of the first land portion which includes the tire equatorial plane;

a pair of second main grooves extending in the tire circumferential direction located further outward in the tire width direction than the first main grooves;

auxiliary grooves disposed in at least one of second land portions located between the first main grooves and the second main grooves which open to the corresponding first main groove or the corresponding second main groove and terminate within the corresponding second land portion.

Each of the auxiliary grooves bends at the bent portion and includes a first auxiliary groove that extends from the opening to the bent portion and the second auxiliary groove that extends from the bent portion to the terminating end portion. The angle θ made by the first auxiliary groove and the second auxiliary groove at the bent portion is in the range 0°<θ<90° (in other words, an acute angle).

The tires of Working Examples 1 to 30 were set as per that indicated in Tables 1 to 3. In other words, tires were prepared with varied in the following specifications:

number of main grooves: two, four;

the ratio between the length a of the first auxiliary groove 31A and the length b of the second auxiliary groove 31B, both constituting the auxiliary groove 31 bent like a fishhook: 0.2a=b (20%), 0.3a=b (30%), 0.5a=b (50%), 0.8a=b (80%), 0.9a=b (90%);

the bend angle θ made by the first auxiliary groove 31A and the second auxiliary groove 31B at the bend point S2: 70°, 80°, 85°, 90°;

the inclination angle φ of the first auxiliary groove 31A with respect to the tire circumferential direction C: 20°, 30°, 70°, 80°;

the third auxiliary grooves 33, which are lug grooves in the third land portion 23, open to the second main groove 12 or not (terminates within the third land portion 23);

the first narrow grooves 32 disposed in the first land portion 21 or not;

the first narrow grooves 32 in the first land portion 21 open to the first main groove 11 or not (terminates within the first land portion 21);

the form of the second land portions 22 has point symmetry or asymmetry with respect to the tire equatorial plane E;

the groove width at the bend point S2, which is the bent portion, with respect to the opening end S1, which is the opening portion of the first auxiliary groove 31A in the second land portion 22: the same, 10% less, 50% less, or 60% less;

the inclination angle α of the second narrow grooves 41 with respect to the tire circumferential direction C: 30°, 70°, 90°;

the first auxiliary groove 31A opens inward in the tire width direction (opens to the first main groove 11) or opens outward (opens to the second main groove 12);

the third narrow grooves 43 are disposed in the third land portions 23 or not;

the third narrow grooves 43 in the third land portions 23 open to the second main grooves 12 or not (terminate within the third land portions 23);

the width of the first narrow grooves 32, the second narrow grooves 41, and the third narrow grooves 43: 1.0 (mm), 1.2 (mm), 1.5 (mm). Additionally, in the second land portions 22, the first auxiliary grooves 31A open to the second main groove 12 and the second auxiliary groove 31B terminates within the second land portion 22.

For comparison, the tire of Conventional Example includes auxiliary grooves with a straight shape (no bend) that open to both sides in the tire width direction (inward and outward) and has point symmetry with reference to the tire equatorial plane E. Additionally, the tire of Comparative Example 1 includes auxiliary grooves with a straight shape (no bend) that open to both sides in the tire width direction (inward and outward) and is not symmetrical with respect to the tire equatorial plane E.

These test tires were evaluated for wet performance, snow performance, and quietness according to the evaluation methods described above. The results thereof are shown in Tables 1 and 3.

As is shown in Tables 1 to 3, tires which had four main grooves, and the ratio between the length a of the first auxiliary groove 31A and the length b of the second auxiliary groove 31B in the range 0.3a<b<0.8a had more excellent wet performance, snow performance, and quietness than those of Conventional Example and Comparative Example 1.

Additionally, tires with the following specifications had excellent wet performance, snow performance, and quietness:

the bend angle θ made by the first auxiliary groove 31A and the second auxiliary groove 31B is 80°;

inclination angle φ of the first auxiliary groove 31A with respect to the tire circumferential direction C is from 30° to 70°;

the first auxiliary grooves 31A in the second land portions 22 do not open to the second main grooves 12 (terminate within the second land portions 22);

the lug grooves (the third auxiliary grooves 33) are disposed in the third land portion 23;

the first narrow grooves 32 in the first land portion 21 do not open to the first main grooves 11 (terminate within the first land portion 21);

the shape of the second land portions 22 have point symmetry with respect to the tire equatorial plane E;

the groove width at the opening end S1 of the first auxiliary groove 31A in the second land portion 22 is from 10% to 50% less than the groove width at the bend point S2;

the inclination angle α of the second narrow grooves 41 with respect to the tire circumferential direction C is from 30° to 70°;

the first auxiliary groove 31A opens to the outer side in the tire width direction (opens to the second main groove 12);

the third narrow grooves 43 are disposed in the third land portions 23;

the third narrow grooves 43 in the third land portion 23 do not open to the second main groove 12 (terminate within the third land portion 23);

the width of the first narrow grooves 32, the second narrow grooves 41, and the third narrow grooves 43 is 1.2 (mm).

TABLE 1

|  | Conventional Example | Comparative Example 1 | Working Example 1 | Working Example 2 |
|---|---|---|---|---|
| Number of main grooves | 2 | 4 | 2 | 4 |
| Form of auxiliary grooves in second land portion | Opens | Opens | Terminates | Terminates |
| Shape of auxiliary groove | No bend | No bend | Fishhook shape | Fishhook shape |
| Ratio of lengths of auxiliary grooves | Same | Same | 50% | 20% |
| Bend angle of first auxiliary groove | None | 100° | 80° | 80° |
| Inclination angle of first auxiliary groove | None | | 70° | 70° |
| Form of auxiliary groove in third land portion | Opens | Opens | Opens | Terminates |
| Narrow grooves in first land portion | Absent | Absent | Absent | Absent |
| Form of narrow grooves in first land portion | Opens | Opens | Opens | Opens |
| Form of second land portions | Point symmetric | Asymmetric | Asymmetric | Asymmetric |
| Groove width of first auxiliary groove | Same | Same | Same | Same |
| Inclination angle of narrow grooves in second land portion | None | None | 90° | 90° |
| Side first auxiliary groove opens to | Both | Both | Inner side | Inner side |
| Narrow grooves in third land portion | Present | Present | Absent | Absent |
| Form of narrow grooves in third land portion | Opens | Opens | Opens | Opens |
| Narrow groove width | 1.0 mm | 1.0 mm | 1.0 mm | 1.0 mm |
| Wet performance | 100 | 100 | 103 | 103 |
| Snow performance | 100 | 103 | 103 | 103 |
| Quietness | 100 | 103 | 101 | 103 |

|  | Working Example 3 | Working Example 4 | Working Example 5 | Working Example 6 |
|---|---|---|---|---|
| Number of main grooves | 4 | 4 | 4 | 4 |
| Form of auxiliary grooves in second land portion | Terminates | Terminates | Terminates | Terminates |
| Shape of auxiliary groove | Fishhook shape | Fishhook shape | Fishhook shape | Fishhook shape |
| Ratio of lengths of auxiliary grooves | 20% | 20% | 20% | 30% |
| Bend angle of first auxiliary groove | 90° | 85° | 70° | 80° |
| Inclination angle of first auxiliary groove | 70° | 70° | 70° | 70° |
| Form of auxiliary groove in third land portion | Terminates | Terminates | Terminates | Terminates |
| Narrow grooves in first land portion | Absent | Absent | Absent | Absent |
| Form of narrow grooves in first land portion | Opens | Opens | Opens | Opens |
| Form of second land portions | Asymmetric | Asymmetric | Asymmetric | Asymmetric |
| Groove width of first auxiliary groove | Same | Same | Same | Same |
| Inclination angle of narrow grooves in second land portion | 90° | 90° | 90° | 90° |
| Side first auxiliary groove opens to | Inner side | Inner side | Inner side | Inner side |
| Narrow grooves in third land portion | Absent | Absent | Absent | Absent |
| Form of narrow grooves in third land portion | Opens | Opens | Opens | Opens |
| Narrow groove width | 1.0 mm | 1.0 mm | 1.0 mm | 1.0 mm |
| Wet performance | 104 | 104 | 105 | 105 |
| Snow performance | 103 | 104 | 104 | 105 |
| Quietness | 104 | 104 | 106 | 106 |

|  | Working Example 7 | Working Example 8 | Working Example 9 | Working Example 10 |
|---|---|---|---|---|
| Number of main grooves | 4 | 4 | 4 | 4 |
| Form of auxiliary grooves in second land portion | Terminates | Terminates | Terminates | Terminates |

TABLE 1-continued

| Shape of auxiliary groove | Fishhook shape | Fishhook shape | Fishhook shape | Fishhook shape |
|---|---|---|---|---|
| Ratio of lengths of auxiliary grooves | 80% | 90% | 50% | 50% |
| Bend angle of first auxiliary groove | 80° | 80° | 80° | 80° |
| Inclination angle of first auxiliary groove | 70° | 70° | 70° | 20° |
| Form of auxiliary groove in third land portion | Terminates | Terminates | Terminates | Terminates |
| Narrow grooves in first land portion | Absent | Absent | Absent | Present |
| Form of narrow grooves in first land portion | Opens | Opens | Opens | Opens |
| Form of second land portions | Asymmetric | Asymmetric | Asymmetric | Asymmetric |
| Groove width of first auxiliary groove | Same | Same | Same | Same |
| Inclination angle of narrow grooves in second land portion | 90° | 90° | 90° | 90° |
| Side first auxiliary groove opens to | Inner side | Inner side | Inner side | Inner side |
| Narrow grooves in third land portion | Absent | Absent | Absent | Absent |
| Form of narrow grooves in third land portion | Opens | Opens | Opens | Opens |
| Narrow groove width | 1.0 mm | 1.0 mm | 1.0 mm | 1.0 mm |
| Wet performance | 106 | 106 | 107 | 108 |
| Snow performance | 106 | 109 | 109 | 110 |
| Quietness | 106 | 105 | 105 | 105 |

TABLE 2

| | Working Example 11 | Working Example 12 | Working Example 13 |
|---|---|---|---|
| Number of main grooves | 4 | 4 | 4 |
| Form of auxiliary grooves in second land portion | Terminates | Terminates | Terminates |
| Shape of auxiliary groove | Fishhook shape | Fishhook shape | Fishhook shape |
| Ratio of lengths of auxiliary grooves | 50% | 50% | 50% |
| Bend angle of first auxiliary groove | 80° | 80° | 80° |
| Inclination angle of first auxiliary groove | 30° | 70° | 80° |
| Form of auxiliary groove in third land portion | Terminates | Terminates | Terminates |
| Narrow grooves in first land portion | Present | Present | Present |
| Form of narrow grooves in first land portion | Opens | Opens | Opens |
| Form of second land portions | Asymmetric | Asymmetric | Asymmetric |
| Groove width of first auxiliary groove | Same | Same | Same |
| Inclination angle of narrow grooves in second land portion | 90° | 90° | 90° |
| Side first auxiliary groove opens to | Inner side | Inner side | Inner side |
| Narrow grooves in third land portion | Absent | Absent | Absent |
| Form of narrow grooves in third land portion | Opens | Opens | Opens |
| Narrow groove width | 1.0 mm | 1.0 mm | 1.0 mm |
| Wet performance | 108 | 109 | 109 |
| Snow performance | 110 | 109 | 110 |
| Quietness | 106 | 106 | 107 |

| | Working Example 14 | Working Example 15 | Working Example 16 |
|---|---|---|---|
| Number of main grooves | 4 | 4 | 4 |
| Form of auxiliary grooves in second land portion | Terminates | Terminates | Terminates |
| Shape of auxiliary groove | Fishhook shape | Fishhook shape | Fishhook shape |
| Ratio of lengths of auxiliary grooves | 50% | 50% | 50% |
| Bend angle of first auxiliary groove | 80° | 80° | 80° |
| Inclination angle of first auxiliary groove | 70° | 80° | 70° |
| Form of auxiliary groove in third land portion | Terminates | Terminates | Terminates |
| Narrow grooves in first land portion | Present | Present | Present |
| Form of narrow grooves in first land portion | Terminates | Terminates | Terminates |

TABLE 2-continued

|  |  |  |  |
|---|---|---|---|
| Form of second land portions | Point symmetric | Point symmetric | Point symmetric |
| Groove width of first auxiliary groove | Same | Same | 10% less |
| Inclination angle of narrow grooves in second land portion | 90° | 90° | 90° |
| Side first auxiliary groove opens to | Inner side | Inner side | Inner side |
| Narrow grooves in third land portion | Absent | Absent | Absent |
| Form of narrow grooves in third land portion | Opens | Opens | Opens |
| Narrow groove width | 1.0 mm | 1.0 mm | 1.0 mm |
| Wet performance | 110 | 110 | 111 |
| Snow performance | 112 | 112 | 111 |
| Quietness | 107 | 108 | 109 |

|  | Working Example 17 | Working Example 18 | Working Example 19 | Working Example 20 |
|---|---|---|---|---|
| Number of main grooves | 4 | 4 | 4 | 4 |
| Form of auxiliary grooves in second land portion | Terminates | Terminates | Terminates | Terminates |
| Shape of auxiliary groove | Fishhook shape | Fishhook shape | Fishhook shape | Fishhook shape |
| Ratio of lengths of auxiliary grooves | 50% | 50% | 50% | 50% |
| Bend angle of first auxiliary groove | 80° | 80° | 80° | 80° |
| Inclination angle of first auxiliary groove | 70° | 70° | 70° | 70° |
| Form of auxiliary groove in third land portion | Terminates | Terminates | Terminates | Terminates |
| Narrow grooves in first land portion | Present | Present | Present | Present |
| Form of narrow grooves in first land portion | Terminates | Terminates | Terminates | Terminates |
| Form of second land portions | Point symmetric | Point symmetric | Point symmetric | Point symmetric |
| Groove width of first auxiliary groove | 50% less | 60% less | 10% less | 50% less |
| Inclination angle of narrow grooves in second land portion | 90° | 90° | 30° | 30° |
| Side first auxiliary groove opens to | Inner side | Inner side | Inner side | Inner side |
| Narrow grooves in third land portion | Absent | Absent | Absent | Absent |
| Form of narrow grooves in third land portion | Opens | Opens | Opens | Opens |
| Narrow groove width | 1.0 mm | 1.0 mm | 1.0 mm | 1.0 mm |
| Wet performance | 112 | 113 | 114 | 115 |
| Snow performance | 113 | 114 | 115 | 116 |
| Quietness | 110 | 111 | 111 | 112 |

TABLE 3

|  | Working Example 21 | Working Example 22 | Working Example 23 |
|---|---|---|---|
| Number of main grooves | 4 | 4 | 4 |
| Form of auxiliary grooves in second land portion | Terminates | Terminates | Terminates |
| Shape of auxiliary groove | Fishhook shape | Fishhook shape | Fishhook shape |
| Ratio of lengths of auxiliary grooves | 50% | 50% | 50% |
| Bend angle of first auxiliary groove | 80° | 80° | 80° |
| Inclination angle of first auxiliary groove | 70° | 70° | 70° |
| Form of auxiliary groove in third land portion | Terminates | Terminates | Terminates |
| Narrow grooves in first land portion | Present | Present | Present |
| Form of narrow grooves in first land portion | Terminates | Terminates | Terminates |
| Form of second land portions | Point symmetric | Point symmetric | Point symmetric |
| Groove width of first auxiliary groove | 10% less | 50% less | 10% less |
| Inclination angle of narrow grooves in second land portion | 30° | 30° | 70° |
| Side first auxiliary groove opens to | Outer side | Outer side | Outer side |
| Narrow grooves in third land portion | Absent | Absent | Absent |
| Form of narrow grooves in third land portion | Opens | Opens | Opens |
| Narrow groove width | 1.0 mm | 1.0 mm | 1.0 mm |
| Wet performance | 115 | 116 | 116 |

TABLE 3-continued

|  | | | |
|---|---|---|---|
| Snow performance | 116 | 117 | 118 |
| Quietness | 113 | 113 | 113 |

|  | Working Example 24 | Working Example 25 | Working Example 26 |
|---|---|---|---|
| Number of main grooves | 4 | 4 | 4 |
| Form of auxiliary grooves in second land portion | Terminates | Terminates | Terminates |
| Shape of auxiliary groove | Fishhook shape | Fishhook shape | Fishhook shape |
| Ratio of lengths of auxiliary grooves | 50% | 50% | 50% |
| Bend angle of first auxiliary groove | 80° | 80° | 80° |
| Inclination angle of first auxiliary groove | 70° | 70° | 70° |
| Form of auxiliary groove in third land portion | Terminates | Terminates | Terminates |
| Narrow grooves in first land portion | Present | Present | Present |
| Form of narrow grooves in first land portion | Terminates | Terminates | Terminates |
| Form of second land portions | Point symmetric | Point symmetric | Point symmetric |
| Groove width of first auxiliary groove | 50% less | 10% less | 50% less |
| Inclination angle of narrow grooves in second land portion | 70° | 70° | 70° |
| Side first auxiliary groove opens to | Outer side | Outer side | Outer side |
| Narrow grooves in third land portion | Absent | Present | Present |
| Form of narrow grooves in third land portion | Opens | Terminates | Terminates |
| Narrow groove width | 1.0 mm | 1.0 mm | 1.0 mm |
| Wet performance | 116 | 117 | 118 |
| Snow performance | 119 | 119 | 120 |
| Quietness | 113 | 114 | 114 |

|  | Working Example 27 | Working Example 28 | Working Example 29 | Working Example 30 |
|---|---|---|---|---|
| Number of main grooves | 4 | 4 | 4 | 4 |
| Form of auxiliary grooves in second land portion | Terminates | Terminates | Terminates | Terminates |
| Shape of auxiliary groove | Fishhook shape | Fishhook shape | Fishhook shape | Fishhook shape |
| Ratio of lengths of auxiliary grooves | 50% | 50% | 50% | 50% |
| Bend angle of first auxiliary groove | 80° | 80° | 80° | 80° |
| Inclination angle of first auxiliary groove | 70° | 70° | 70° | 70° |
| Form of auxiliary groove in third land portion | Terminates | Terminates | Terminates | Terminates |
| Narrow grooves in first land portion | Present | Present | Present | Present |
| Form of narrow grooves in first land portion | Terminates | Terminates | Terminates | Terminates |
| Form of second land portions | Point symmetric | Point symmetric | Point symmetric | Point symmetric |
| Groove width of first auxiliary groove | 10% less | 50% less | 10% less | 50% less |
| Inclination angle of narrow grooves in second land portion | 70° | 70° | 70° | 70° |
| Side first auxiliary groove opens to | Outer side | Outer side | Outer side | Outer side |
| Narrow grooves in third land portion | Present | Present | Present | Present |
| Form of narrow grooves in third land portion | Terminates | Terminates | Terminates | Terminates |
| Narrow groove width | 1.5 mm | 1.5 mm | 1.2 mm | 1.2 mm |
| Wet performance | 118 | 119 | 119 | 120 |
| Snow performance | 120 | 120 | 120 | 120 |
| Quietness | 115 | 116 | 117 | 118 |

The invention claimed is:

1. A pneumatic tire comprising:

a pair of first main grooves extending in a tire circumferential direction disposed on first and second outer sides in a tire width direction of a tire equatorial plane;

a pair of second main grooves extending in the tire circumferential direction located further outward in the tire width direction than the first main grooves;

a first land portion formed by the pair of the first main grooves and is arranged on the tire equatorial plane;

a pair of second land portions respectively formed by the first and second main grooves on each of the first and the second outer sides in a tire width direction; and auxiliary grooves disposed in the pair of second land portions located between the first main grooves and the second main grooves; wherein each of the auxiliary grooves bends at a bent portion and includes a first auxiliary groove which extends from the bent portion to an opening with respect to the second main groove and a second auxiliary groove which extends from the bent portion to a terminating end portion within the second land portion;

the first auxiliary groove of the auxiliary grooves includes first auxiliary grooves opening in opposite directions to one another in the tire width direction on the first and second outer sides;

a length a of the first auxiliary groove and a length b of the second auxiliary groove have a relationship 0.3a<b<0.8a;

an angle θ made by the first auxiliary groove and the second auxiliary groove at the bent portion is in a range 0°<θ<85°;

an angle φ defined as an angle of a tangent line of a center line at an opening end of the first auxiliary groove with respect to the tire circumferential direction and inclination angle α of second narrow grooves with respect to the tire circumferential direction are in a plus/minus opposite relationship to each other;

the second narrow grooves intersect the first auxiliary groove in the second land portion;

the angle φ is not less than 30 degrees and not more than 70 degrees; and a groove width of the first auxiliary groove gradually lessens as the first auxiliary groove extends from the opening end toward the bent portion.

2. The pneumatic tire according to claim 1, further comprising third land portions disposed further outward in the tire width direction than the second main grooves, and third auxiliary grooves which are disposed in the third land portions and extend outward in the tire width direction; wherein end portions of the third auxiliary grooves proximal to the second main grooves terminate within the third land portions.

3. The pneumatic tire according to claim 1, further comprising first narrow grooves disposed in the first land portion.

4. The pneumatic tire according to claim 3, wherein the first narrow grooves terminate within the first land portion.

5. The pneumatic tire according to claim 3, wherein the first narrow grooves have a width of 1.2 mm or less.

6. The pneumatic tire according to claim 1, wherein a groove width of the first auxiliary groove at the bent portion is from 10% to 50% less than a groove width at the opening.

7. The pneumatic tire according to claim 3, wherein the second narrow grooves are disposed in the second land portions, the second narrow grooves forming an angle with the tire circumferential direction of from 30° to 70°.

8. The pneumatic tire according to claim 7, wherein the second narrow grooves have a width of 1.2 mm or less.

9. The pneumatic tire according to claim 2, further comprising third narrow grooves disposed in third land portions, the third narrow grooves extending in a shoulder direction.

10. The pneumatic tire according to claim 9, wherein the third narrow grooves do not open to the second main grooves.

11. The pneumatic tire according to claim 9, wherein the third narrow grooves have a width of 1.2 mm or less.

12. The pneumatic tire according to claim 1, wherein side walls extending in the tire circumferential direction of the first main grooves and the second main grooves have a zigzag shape in which a position in the tire width direction of the side walls periodically changes.

13. The pneumatic tire according to claim 1, wherein the second narrow grooves are disposed in the second land portions at constant intervals in the tire circumferential direction.

14. The pneumatic tire according to claim 1, wherein the second land portions have a point symmetrical configuration with respect to the tire equatorial plane.

15. The pneumatic tire according to claim 1, wherein the opening end of the first auxiliary groove to the second main groove is disposed at a different position from the bent portion in the tire circumferential direction, and the center line of the first auxiliary groove has a circular shape that is convex toward a first main groove side in the tire width direction.

16. The pneumatic tire according to claim 1, wherein the terminating end portion terminates without connecting to other grooves.

17. The pneumatic tire according to claim 1, wherein an inclination direction of the second auxiliary grooves with respect to the tire circumferential direction at the first outer side in the tire width direction and an incline direction of the second auxiliary grooves with respect to the tire circumferential direction at the second outer side in a tire width direction are the same as each other.

18. The pneumatic tire according to claim 1, wherein a groove width of the auxiliary grooves at the bent portion is from 50% to 90% of the groove width of the auxiliary grooves at the opening end.

19. The pneumatic tire according to claim 1, wherein a portion of each of the first auxiliary grooves, excluding the bent portion, is disposed between a portion of one of the second auxiliary grooves, excluding the bent portion, and one of the first main grooves in the tire width direction.

20. The pneumatic tire according to claim 1, wherein the second auxiliary groove extends in a rectilinear manner.

21. A pneumatic tire comprising:

a pair of first main grooves extending in a tire circumferential direction disposed on first and second outer sides in a tire width direction of a tire equatorial plane;

a pair of second main grooves extending in the tire circumferential direction located further outward in the tire width direction than the first main grooves;

a first land portion formed by the pair of the first main grooves and is arranged on the tire equatorial plane;

a pair of second land portions respectively formed by the first and second main grooves on each of the first and the second outer sides in a tire width direction; and auxiliary grooves disposed in the pair of second land portions located between the first main grooves and the second main grooves; wherein each of the auxiliary grooves bends at a bent portion and includes a first auxiliary groove which extends from the bent portion to an opening with respect to the second main groove and a second auxiliary groove which extends from the bent portion to a terminating end portion within the second land portion, the first auxiliary groove of the auxiliary grooves includes first auxiliary grooves opening in opposite directions to one another in the tire width direction on the first and second outer sides, a length a of the first auxiliary groove and a length b of the second auxiliary groove have a relationship 0.3a<b<0.8a, an angle θ made by the first auxiliary groove and the second auxiliary groove at the bent portion is in a range 0°<θ<85°, an angle φ defined as an angle of a tangent line of a center line at an opening end of the first auxiliary groove with respect to the tire circumferential direction and inclination angle α of second narrow grooves with respect to the tire circumferential direction are in a plus/minus opposite relationship to each other, the second narrow grooves intersect the first auxiliary groove in the second land portion, the opening end of the first auxiliary groove to the second main groove is disposed a different position from the bent portion in the tire circumferential direction, the center line of the first auxiliary groove has a circular shape that is convex toward a first main groove side in the tire width direction, and a groove width of the first auxiliary groove gradually lessens as the first auxiliary groove extends from the opening end toward the bent portion.

22. The pneumatic tire according to claim 21, wherein the terminating end portion terminates without connecting to other grooves.

23. The pneumatic tire according to claim 21, wherein an inclination direction of the second auxiliary grooves with respect to the tire circumferential direction at the first outer side in the tire width direction and an incline direction of the second auxiliary grooves with respect to the tire circumferential direction at the second outer side in a tire width direction are the same as each other.

24. A pneumatic tire comprising:
- a pair of first main grooves extending in a tire circumferential direction disposed on first and second outer sides in a tire width direction of a tire equatorial plane;
- a pair of second main grooves extending in the tire circumferential direction located further outward in the tire width direction than the first main grooves;
- a first land portion formed by the pair of the first main grooves and is arranged on the tire equatorial plane;
- a pair of second land portions respectively formed by the first and second main grooves on each of the first and the second outer sides in a tire width direction; and
- auxiliary grooves disposed in the pair of second land portions located between the first main grooves and the second main grooves; wherein
- each of the auxiliary grooves bends at a bent portion and includes a first auxiliary groove which extends from the bent portion to an opening with respect to the second main groove and a second auxiliary groove which extends from the bent portion to a terminating end portion within the second land portion,
- the first auxiliary groove of the auxiliary grooves includes first auxiliary grooves opening in opposite directions to one another in the tire width direction on the first and second outer sides,
- a length a of the first auxiliary groove and a length b of the second auxiliary groove have a relationship 0.3a<b<0.8a,
- an angle θ made by the first auxiliary groove and the second auxiliary groove at the bent portion is in a range 0°<θ<85°,
- an angle φ defined as an angle of a tangent line of a center line at an opening end of the first auxiliary groove with respect to the tire circumferential direction and inclination angle α of second narrow grooves with respect to the tire circumferential direction are in a plus/minus opposite relationship to each other,
- the second narrow grooves intersect the first auxiliary groove in the second land portion,
- the terminating end portion terminates without connecting to other grooves, and
- a groove width of the first auxiliary groove gradually lessens as the first auxiliary groove extends from the opening end toward the bent portion.

25. The pneumatic tire according to claim 24, wherein an inclination direction of the second auxiliary grooves with respect to the tire circumferential direction at the first outer side in the tire width direction and an incline direction of the second auxiliary grooves with respect to the tire circumferential direction at the second outer side in a tire width direction are the same as each other.

* * * * *